United States Patent
Fujita et al.

(10) Patent No.: US 6,890,490 B1
(45) Date of Patent: May 10, 2005

(54) HYDROGEN ABSORBING TANK APPARATUS

(75) Inventors: Nobuo Fujita, Toyota (JP); Hidehito Kubo, Kariya (JP)

(73) Assignees: Toyota Jidosha Kabushiki Kaisha, Toyota (JP); Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/397,287

(22) Filed: Sep. 16, 1999

(30) Foreign Application Priority Data

Sep. 25, 1998 (JP) ............................................ 10-270995

(51) Int. Cl.$^7$ .......................... G05D 16/00; H01M 8/00
(52) U.S. Cl. ...................... 422/112; 422/198; 422/199; 429/13; 429/14; 429/15; 429/16; 429/17; 429/18; 429/19; 429/20; 429/21; 429/22; 429/23; 429/24; 429/25; 429/26; 429/27; 429/28; 429/29; 429/30; 429/31; 429/32; 429/33; 429/34; 429/35; 429/36; 429/37
(58) Field of Search ................................. 422/198, 199, 422/112; 429/13–46

(56) References Cited

U.S. PATENT DOCUMENTS 4,085,709 A 4/1978 Tangri ........................ 423/1 A
5,678,410 A * 10/1997 Fujita et al. ..................... 62/7

FOREIGN PATENT DOCUMENTS

| JP | A-7-37598 | 2/1995 |
| JP | A-7-49037 | 2/1995 |
| JP | A-7-99057 | 4/1995 |
| JP | A-10-64567 | 3/1998 |

* cited by examiner

Primary Examiner—Glenn Caldarola
Assistant Examiner—Alexis Wachtel
(74) Attorney, Agent, or Firm—Oliff & Berridge PLC

(57) ABSTRACT

A gas compressor and a bypass that bypasses the gas compressor are provided between a hydrogen absorbing tank and a hydrogen gas consumer device such as, for example, a fuel cell. When the hydrogen gas generating pressure is low during an initial period of the hydrogen gas releasing operation of the hydrogen absorbing tank, the gas compressor is operated. When the hydrogen gas generating pressure of the hydrogen absorbing tank becomes sufficiently high due to normalization of the operation of the fuel cell or the like, the gas compressor is stopped, and hydrogen gas is supplied to the fuel cell via the bypass.

16 Claims, 4 Drawing Sheets

HYDROGEN ABSORBING TANK APPARATUS

INCORPORATION BY REFERENCE

The disclosure of Japanese Patent Application No. HEI 10-270995 filed on Sep. 25, 1998, including the specification, drawings and abstract, is incorporated herein by reference in its entirety.

BACKGROUND OF THE INVENTION

1. Field of Invention

The present invention relates to hydrogen absorbing tank apparatus.

2. Description of Related Art

In a conventional art, when hydrogen gas that is stored by absorption or occlusion in a hydrogen absorbing tank is to be extracted from the tank and supplied to a fuel cell, the hydrogen absorbing tank needs to be heated by using hot water or the like in order to provide release heat for releasing hydrogen gas from a hydrogen absorbing material. For example, in a system where hydrogen gas is extracted from a hydrogen absorbing tank and supplied to a fuel cell, heat produced by the fuel cell is used to heat a hydrogen absorbing material disposed in the hydrogen absorbing tank.

Furthermore, in order to ensure that the hydrogen gas producing pressure at which hydrogen gas is released from the hydrogen absorbing tank will be equal to or higher than a reference pressure of a hydrogen gas consumer device (e.g., the fuel cell), the hydrogen absorbing tank needs to be heated to a predetermined temperature when it is at a relatively low temperature or the like.

In a fuel cell used as a source of drive energy for a vehicle, it is important to quickly supply hydrogen gas to the fuel cell to promptly cause the fuel cell to start generating power. However, if the hydrogen absorbing tank for supplying hydrogen gas to the fuel cell has a low temperature, for example, when the vehicle ambient temperature is low, the hydrogen producing pressure becomes low and the amount of hydrogen gas supplied to the fuel cell is low. In such a case, there is a danger of insufficient power generation, and also a danger of insufficient heat supply from the fuel cell to the hydrogen absorbing tank, which will result in a further delay of the start of power generation of the fuel cell. A delay of the start of power generation at the time of hydrogen release from the hydrogen absorbing tank also occurs when hydrogen gas is supplied from the hydrogen absorbing tank to a hydrogen gas consumer device other than a fuel cell for generating vehicle driving energy.

A conceivable measure for improving the aforementioned situation at a low temperature is to employ a hydrogen absorbing material whose hydrogen producing pressure is high at low temperatures. However, if this measure is adopted, the hydrogen producing pressure becomes too high after the fuel cell is started up or when the ambient temperature is high. Therefore, this measure requires an increase of the pressure resistance of the hydrogen absorbing tank and limits the variety of hydrogen absorbing materials that can be used.

Japanese Patent Application Laid-Open No. HEI 7-37598 proposes that a heating wire be added to a hydrogen absorbing tank so that the hydrogen absorbing tank can be heated by electrifying the electric heater (i.e., the heating wire).

However, the supplemental electrical heating of a hydrogen absorbing tank has significant problems in safety and electric energy consumption. Normally, the amount of heat generated by a heating wire is considerably less than that generated by a hydrogen gas consumer device such as a fuel cell or the like. Therefore, the supplemental electrical heating only slightly accelerates the heating of a fuel cell; that is, the heating rate is increased only slightly from the level achieved without the supplemental electrical heating.

As another conceivable measure, a burner capable of producing larger amounts of heat than an electric heater may be externally provided so that combustion gas from the burner is used to heat a hydrogen absorbing tank. However, this measure causes problems of fuel storage requirement, complication of the system, degradation of safety, deterioration of efficiency, and the like.

SUMMARY OF THE INVENTION

Accordingly, it is one object of the present invention to provide a hydrogen absorbing tank apparatus that is excellent in energy conservation and also excellent in its low-temperature starting performance.

In accordance with one aspect of the invention, a hydrogen absorbing tank apparatus includes a hydrogen absorbing tank containing a hydrogen absorbing material that allows hydrogen gas to move into the hydrogen absorbing tank from an outside thereof and to move out of the hydrogen absorbing tank. A gas compressor is disposed between the hydrogen absorbing tank and a hydrogen gas consumer device. The gas compressor compresses hydrogen gas at least to a predetermined reference pressure of the hydrogen gas consumer device. A bypass device that opens only when a hydrogen gas producing pressure of the hydrogen absorbing tank is higher than the reference pressure is connected in parallel to the gas compressor. A controller operates the gas compressor to compress hydrogen gas from the hydrogen absorbing tank at least to the reference pressure when the hydrogen absorbing tank has a low temperature and the hydrogen gas producing pressure is lower than the reference pressure despite an operation of the hydrogen gas consumer device. Therefore, when the temperature of the hydrogen absorbing tank is low and the hydrogen gas producing pressure during an early period of the hydrogen gas releasing operation is low, the gas compressor is operated. When the temperature of the hydrogen absorbing tank subsequently increases to a sufficiently high temperature due to normalization of the operation of the hydrogen gas consumer device and the like, the gas compressor is stopped and hydrogen gas is supplied to the hydrogen gas consumer device via the bypass device.

In this construction, a supplemental power supplied by the gas compressor during an early period of start-up is provided in the form of a substantially adiabatic thermal compression work of hydrogen gas. Therefore, the amount of supplemental energy needed becomes considerably small in comparison with a conventional construction in which a supplemental energy is provided by an electric heater in the form of an isobaric heating of hydrogen gas. Therefore, the invention prevents stored power from being wasted, and realizes size and weight reductions of a storage battery.

A time lag between start of the gas compressor and production of hydrogen gas at a necessary pressure is significantly shorter than the time lag occurring in a case where the temperature of the hydrogen absorbing tank is raised by an electric heater. Therefore, the hydrogen absorbing tank apparatus of the invention is particularly suitable to a system that needs a quick start, for example, an electric vehicle.

The gas compressor and a prime motor (typically, an electric motor) employed in a construction according to the invention need only to supply hydrogen gas during start-up of the hydrogen absorbing tank or the hydrogen gas consumer device. The gas compressor and the prime motor may be designed merely for short-time operation. Furthermore, the gas compressor and the motor do not need to have capacity corresponding to the full-load operation of the hydrogen absorbing tank or the hydrogen gas consumer device. Therefore, size reductions of the gas compressor and the motor are possible. It is not necessary to provide a very large load increase.

Furthermore, the construction of the invention makes it possible for the hydrogen absorbing tank to produce a necessary hydrogen gas producing pressure and also makes it possible to supply hydrogen gas via the bypass passage. Therefore, the invention eliminates the need to operate the gas compressor when the hydrogen absorbing tank is producing a necessary hydrogen gas producing pressure, which is undesirable and wastes power. The invention thus achieves high efficiency.

The hydrogen gas consumer device may be a fuel cell from which heat is supplied to the hydrogen absorbing tank. Therefore, quick start of the fuel cell can be realized. The amount of heat quickly generated by the fuel cell can be used to heat the hydrogen absorbing tank so as to accelerate the start-up of the hydrogen absorbing tank. Furthermore, power generated by the fuel cell can be used to operate the gas compressor, so that a battery for storing power for temporary operation of the gas compressor can be reduced in size.

Heat generated by the gas compressor or the motor that operates the gas compressor may be supplied to the fuel cell or to the hydrogen absorbing tank by using a heating medium. This construction will further improve start-up performance.

If the hydrogen gas producing pressure of the hydrogen absorbing tank has decreased due to a decrease in the amount of hydrogen stored in the hydrogen absorbing tank, the gas compressor may be operated for supplemental pressurization of hydrogen gas supplied to the hydrogen gas consumer device. This construction increases the utilization rate (effective hydrogen absorbing capacity) of the hydrogen absorbing tank.

Furthermore, if the hydrogen gas producing pressure of a hydrogen gas generator device that supplies hydrogen gas to the hydrogen absorbing tank is lower than the hydrogen absorbing pressure of the hydrogen absorbing tank, hydrogen gas supplied from the hydrogen gas generator device to the hydrogen absorbing tank may be pressurized. This construction increases the operation efficiency of the gas compressor.

Further, even if the hydrogen gas producing pressure of the hydrogen gas generator device is higher than the hydrogen absorbing pressure of the hydrogen absorbing tank, the gas compressor may be operated so that hydrogen gas is absorbed into the hydrogen absorbing tank at an increased pressure. Particularly, during an ending period of the absorption and storage period of the hydrogen absorbing tank, hydrogen gas produced from the hydrogen gas generator device may be pressurized by the gas compressor and then absorbed and stored into the hydrogen absorbing tank. In this manner, a further increased amount of hydrogen gas can be absorbed and stored into the hydrogen absorbing tank. Furthermore, during an initial period (during start-up) of the subsequent hydrogen gas release from the hydrogen absorbing tank to the hydrogen gas consumer device, sufficiently high-pressure hydrogen gas can be released even if the temperature is low. Therefore, the start-up of the hydrogen absorbing tank and the hydrogen gas consumer device can be further accelerated.

Further, if the hydrogen gas producing pressure of the hydrogen gas generator device that supplies hydrogen gas to the hydrogen absorbing tank is lower than the reference pressure of the hydrogen gas consumer device (for example, during start-up of the hydrogen gas generator device or the like), hydrogen gas supplied from the hydrogen gas generator device to the hydrogen gas consumer device may be pressurized. This construction improves the operation efficiency of the gas compressor.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the present invention will be described in detail hereinafter with reference to the accompanying drawings.

Figure 1:
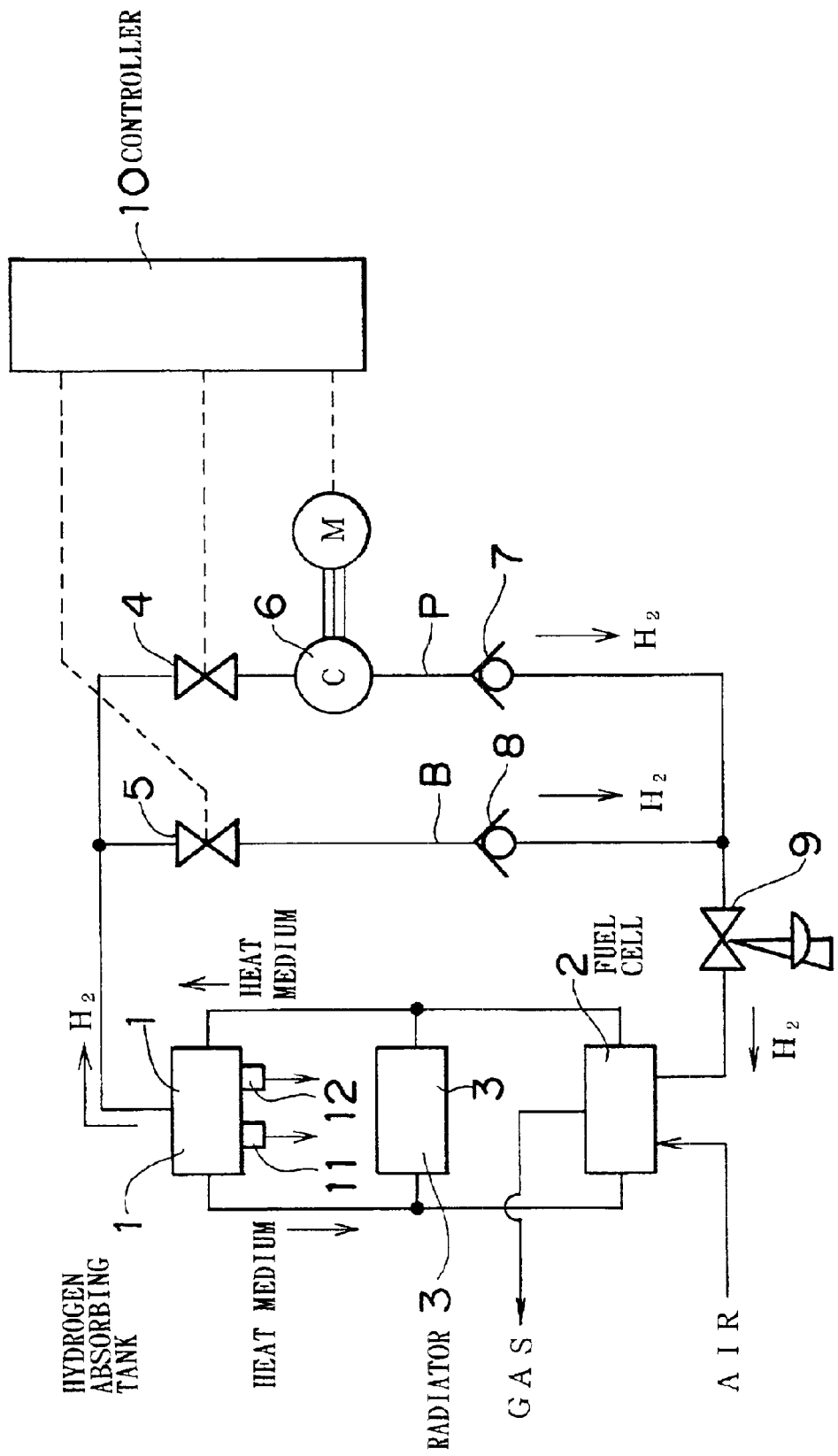
FIG. 1 is a system diagram of a hydrogen gas piping illustrating a first embodiment of the hydrogen absorbing tank apparatus of the invention.

FIG. 1 is a system diagram of a hydrogen absorbing tank apparatus according to a first embodiment, illustrating a hydrogen gas flow passage in particular.

Referring to FIG. 1, a hydrogen absorbing tank 1 contains a hydrogen absorbing alloy powder. The hydrogen absorbing tank 1 is connected to a hydrogen-oxygen fuel cell 2 and a radiator 3 by piping. Cooling water, that is, a heating medium, is circulated between the hydrogen absorbing tank 1, the fuel cell 2 and the radiator 3 by using valves and a circulating pump (not shown). During a normal power generating operation, heat generated by the fuel cell 2 is supplied to the hydrogen absorbing tank 1 in order to produce or release hydrogen gas from the hydrogen absorbing tank 1, and a surplus amount of heat is discharged through the radiator 3.

Hydrogen gas from the hydrogen absorbing tank 1 is supplied to a compression passage P via a control valve 4, and also to a bypass passage B via a control valve 5. The compression passage P is provided with a compressor 6 for compressing hydrogen gas that flows in from the control valve 4, and a check valve 7 provided at an ejection side of the compressor 6 for preventing reverse flow of hydrogen gas. The bypass passage B is provided with a check valve 8 for preventing reverse flow of hydrogen gas. After the pressure of hydrogen gas from the compression passage P or the bypass passage B is adjusted by a pressure adjusting valve 9, hydrogen gas is introduced to an anode of the fuel cell 2.

The compressor 6 is formed by a closed type compressor that has a built-in motor M. The compressor 6 has a high compression ratio. That is, the compressor 6 is capable of achieving a compression to or above a reference pressure of the fuel cell 2 (0.2 MPa in this embodiment) even if the hydrogen absorbing tank 1 is very cold.

A controller 10 controls the control valves 4, 5 and also controls the operation of the motor M disposed within the compressor 6. A pressure sensor 11 detects the pressure in the hydrogen absorbing tank 1. A temperature sensor 12 detects the temperature of the hydrogen absorbing tank 1.

Figure 2:
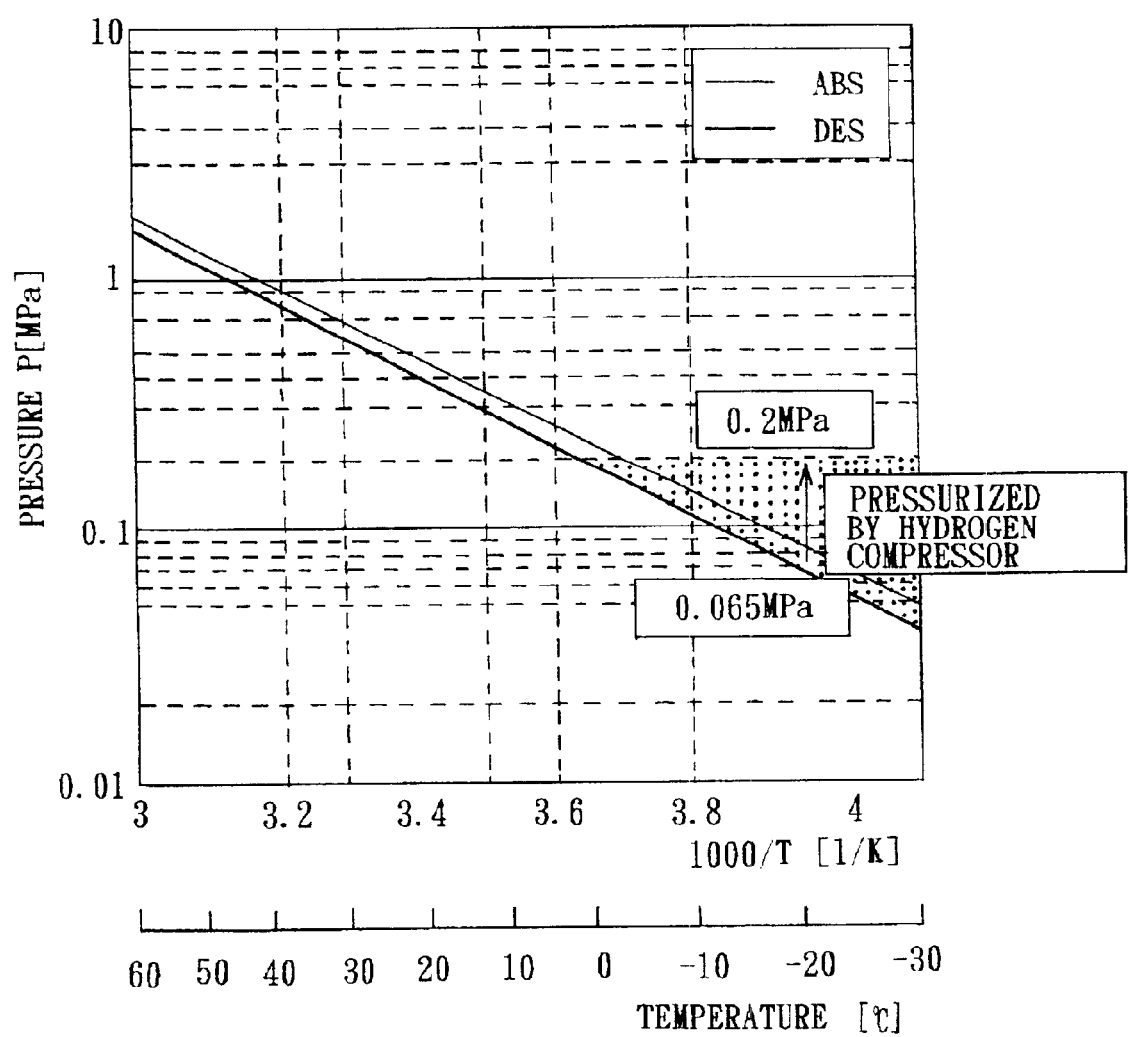
FIG. 2 indicates temperature-equilibrium pressure characteristics of a hydrogen absorbing alloy powder used in the first embodiment.

FIG. 2 is a graph indicating temperature-equilibrium pressure characteristics of the hydrogen absorbing alloy powder contained in the hydrogen absorbing tank 1. In FIG. 2, a line ABS indicates a temperature-equilibrium pressure characteristic exhibited when hydrogen has been absorbed or occluded, and a line DES indicates a temperature-equilibrium pressure characteristic exhibited when hydrogen has been released. The graph of FIG. 2 indicates that the equilibrium pressure becomes lower than the reference pressure 0.2 MPa of the fuel cell 2 approximately at or below 0° C. In this embodiment, the compressor 6 is operated if the temperature during a start-up is lower than 5° C. (the equilibrium pressure is lower than about 0.3 MPa), taking into consideration a temperature drop of the hydrogen absorbing alloy powder due to hydrogen gas releasing heat.

A control operation of the fuel cell apparatus including the hydrogen absorbing tank that is performed by the controller 10 will be described. Since the control operation is simple, no flowchart of the control operation is provided. The control valves 4, 5 are closed for safety reasons before the system is operated. At the start of operation, the control valves 4, 5 are opened.

At a start of the apparatus, the pressure sensor 11 detects the pressure of the hydrogen absorbing tank 1, and the controller 10 determines whether the detected pressure is equal to or less than 0.3 MPa. If the detected pressure is equal to or less than 0.3 MPa, the controller 10 operates the compressor 6. The pressure of compressed hydrogen gas is adjusted to the reference pressure 0.2 MPa of the fuel cell 2 by the pressure adjusting valve 9. Hydrogen gas is then supplied to the fuel cell 2. At the same time, air at the same pressure is supplied to a cathode of the fuel cell 2, so that the fuel cell 2 is operated.

After that, the heating medium supplied from the fuel cell 2 to the hydrogen absorbing tank 1 is heated to a high temperature due to a temperature increase of the fuel cell 2, so that the heat medium heats the hydrogen absorbing alloy powder disposed in the hydrogen absorbing tank 1. Then, the hydrogen gas releasing pressure of the hydrogen absorbing tank 1 becomes equal to or higher than 0.2 MPa and tends to rise, so that hydrogen gas is supplied to the fuel cell 2 via the check valve 8 of the bypass passage B.

If the hydrogen gas releasing pressure is equal to or higher than 0.25 MPa and tends to rise after a predetermined length of time elapses following the start of operation, the controller 10 stops the compressor 6.

Through this control operation, the fuel cell 2 can be quickly started while the amount of supplemental energy added to the system is minimized.

In this embodiment, the pressure of hydrogen supplied from the hydrogen absorbing tank 1 is increased by the compressor 6 if the pressure is lower than a predetermined pressure. The case where the pressure in the hydrogen absorbing tank 1 is lower than the predetermined pressure includes a case where the amount of hydrogen stored in the hydrogen absorbing tank 1 has become small.

Figure 3:
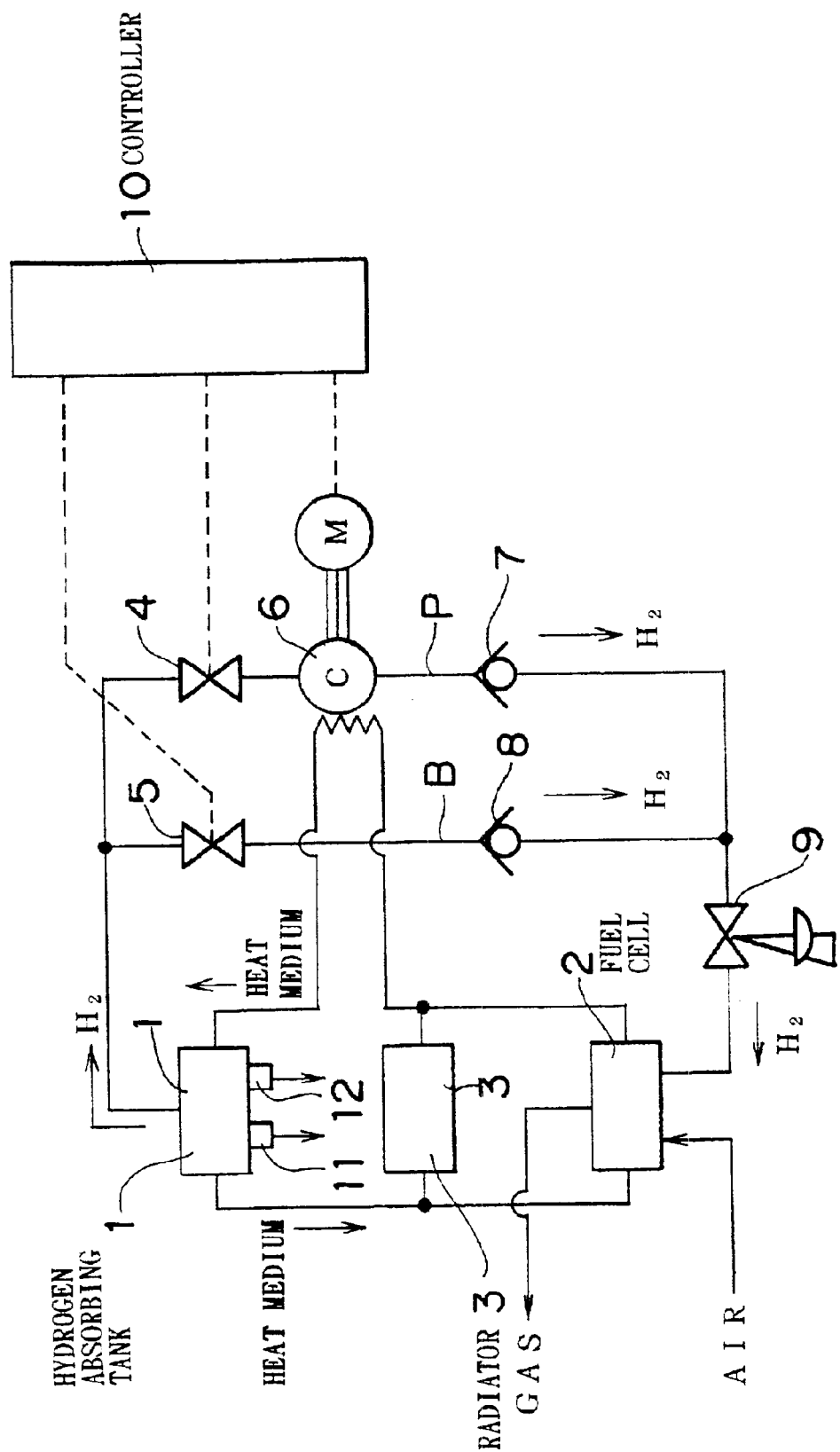
FIG. 3 is a diagram of a hydrogen gas piping illustrating a second embodiment of the hydrogen absorbing tank apparatus of the invention.

A second embodiment will be described with reference to FIG. 3.

The second embodiment has a construction similar to that of the first embodiment shown in FIG. 1, but is designed so that a heat medium from a hydrogen absorbing tank 1 cools the compressor 6 and the motor M.

Therefore, the second embodiment is able to prevent the overheating of the compressor 6 and the motor M and to achieve good supplemental heating of the hydrogen absorbing tank 1.

Figure 4:
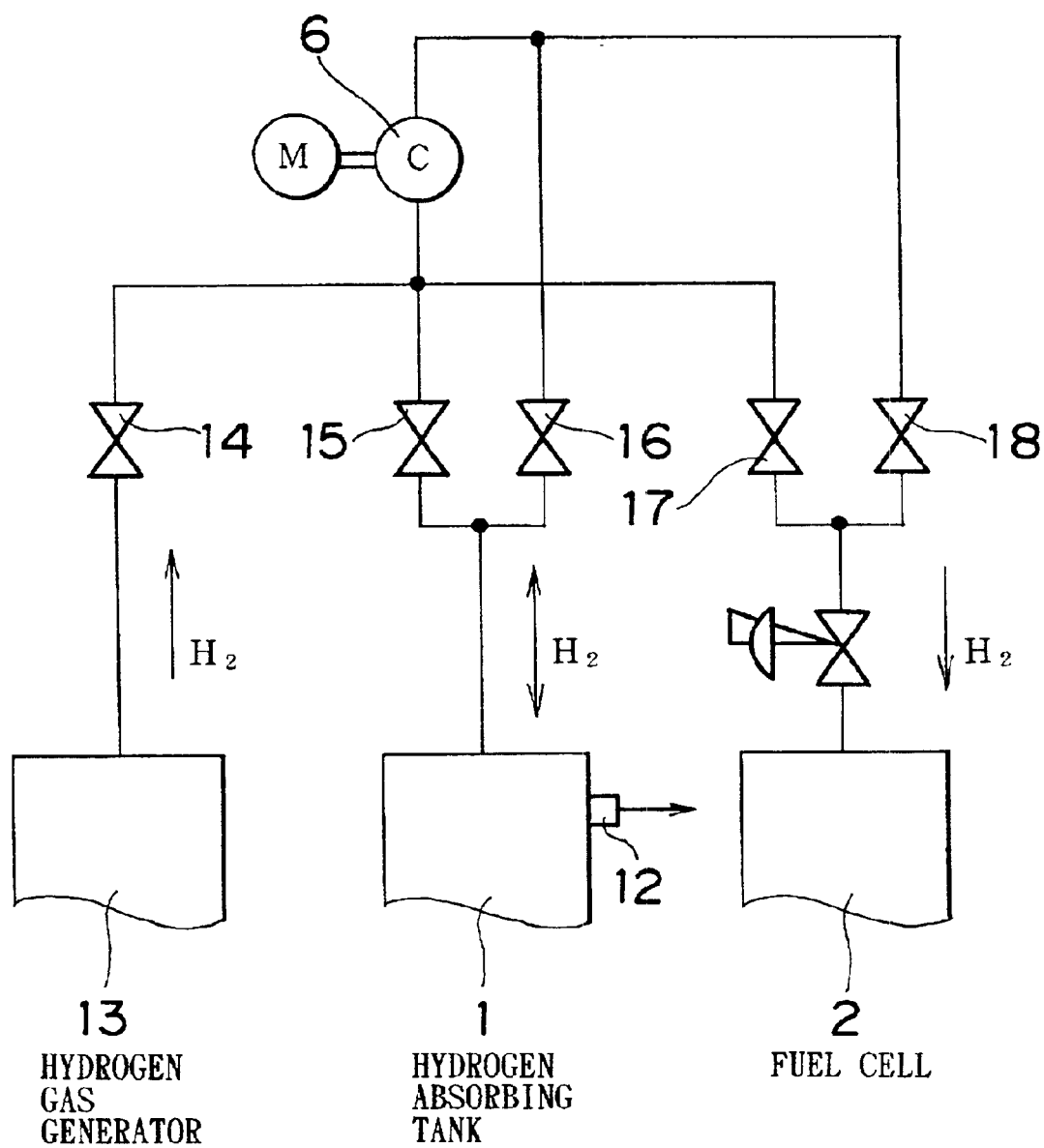
FIG. 4 is a diagram of a hydrogen gas piping illustrating a third embodiment of the hydrogen absorbing tank apparatus of the invention.

A third embodiment will be described with reference to FIG. 4.

The third embodiment is similar to the first embodiment, but differs as follows. That is, a hydrogen gas generator 13 that generates hydrogen gas by reforming methanol is added to the construction shown in FIG. 1. The hydrogen gas generator 13, a hydrogen absorbing tank 1 and a fuel cell 2 are connected to an input pipe of a compressor 6 via control valves 14, 15 and 17, respectively. The hydrogen absorbing tank 1 and the fuel cell 2 are also connected to an output pipe of the compressor 6 via control valves 16 and 18, respectively.

The operation of this hydrogen gas generator-hydrogen absorbing tank-fuel cell system will be described.

The flowing of fluid into and out of the hydrogen absorbing tank 1, the fuel cell 2 and the hydrogen gas generator 13 will be described only with reference to hydrogen gas, and will not be described with respect to other fluids.

When the temperature detected by the temperature sensor 12 provided in the hydrogen absorbing tank 1 is low, the controller 10 determines that the hydrogen absorbing tank 1 has a low temperature, and is a case where the hydrogen gas pressure in the hydrogen absorbing tank 1 is lower than a predetermined pressure. In that case, the control valves 15, 18 are opened and the control valves 14, 16, 17 are closed, and the compressor 6 is operated, thereby increasing the pressure of hydrogen gas produced from the hydrogen absorbing tank 1 as in the first embodiment.

When the controller 10 determines that the hydrogen absorbing tank 1 has a high temperature, that is, when the hydrogen gas pressure in the hydrogen absorbing tank 1 is higher than the predetermined pressure, the control valves 15, 17 are opened and the control valves 14, 16, 18 are closed; alternatively, the control valves 16, 18 are opened and the control valves 14, 15, 17 are closed. The compressor 6 is then stopped. Therefore, hydrogen gas produced from the hydrogen absorbing tank 1 is supplied to the fuel cell 2 without being compressed.

When the controller 10 determines that the temperature detected by a temperature sensor (not shown) provided in the hydrogen gas generator 13 is higher than a predetermined value, that is, if the hydrogen gas generating pressure in the hydrogen gas generator 13 is higher than a predetermined pressure, the control valves 14, 15 are opened and the control valves 16, 17, 18 are closed so as to store hydrogen gas generated by the hydrogen gas generator 13 into the hydrogen absorbing tank 1 by absorption or occlusion.

When the controller 10 determines that the temperature of the hydrogen gas generator 13 is lower than the predetermined value, that is, if the hydrogen gas generating pressure in the hydrogen gas generator 13 is lower than the predetermined pressure, the control valves 14, 16 are opened to store hydrogen gas from the hydrogen gas generator 13 into the hydrogen absorbing tank 1. The compressor 6 is operated to supply temperature-increased hydrogen gas into the hydrogen absorbing tank 1.

To supply the fuel cell 2 with hydrogen gas from the hydrogen gas generator 13 in a case where the temperature of the hydrogen gas generator 13 is high, the control valves 14, 17 are opened and the control valves 15, 16, 18 are closed.

When the temperature of the hydrogen gas generator 13 is low, that is, when the hydrogen gas generating pressure is low and the reference pressure to the fuel cell 2 is low, the control valves 14, 18 are opened so as to supply hydrogen gas from the hydrogen gas generator 13 to the fuel cell 2. The compressor 6 is operated to supply pressurized hydrogen gas to the fuel cell 2.

The hydrogen gas generator 13 may be provided with a pressure sensor (not shown) instead of the temperature sensor. In that case, the operation of the compressor 6 may be determined by detecting the hydrogen gas generating pressure in the hydrogen gas generator 13.

In this embodiment, hydrogen gas can be moved by using the compressor 6 not only at the time of a low-temperature start of the hydrogen absorbing tank 1 but also in other occasions. Therefore, ease of use improves, and energy efficiency increases.

The controller (controller 10) can be implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller also can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the processes described herein can be used as the controller. A distributed processing architecture can be used for maximum data/signal processing capability and speed.

While the present invention has been described with reference to preferred embodiments thereof, it is to be understood that the invention is not limited to the disclosed embodiments or constructions. To the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. A hydrogen absorbing tank apparatus comprising:

a hydrogen absorbing tank containing a hydrogen absorbing material that allows hydrogen gas to move into the hydrogen absorbing tank from an outside thereof and to move out of the hydrogen absorbing tank;

a gas compressor disposed between the hydrogen absorbing tank and a hydrogen gas consumer device, the gas compressor compressing the hydrogen gas output from the hydrogen absorbing tank at least to a predetermined reference pressure of the hydrogen gas consumer device;

a bypass that opens only when a hydrogen gas generating pressure of the hydrogen absorbing tank is higher than the predetermined reference pressure, the bypass connected between the hydrogen absorbing tank and the hydrogen gas consumer device in parallel to the gas compressor; and a controller that operates the gas compressor to compress hydrogen gas output from the hydrogen absorbing tank at least to the predetermined reference pressure when the hydrogen absorbing tank has a low temperature and the hydrogen gas generating pressure of the hydrogen absorbing tank is believed to be lower than the predetermined reference pressure; wherein:

the hydrogen gas consumer device includes a fuel cell from which heat is supplied to the hydrogen absorbing tank;

the controller operates the gas compressor during an initial period of operation of the fuel cell; and at least one of the gas compressor and a motor that operates the gas compressor is connected to at least one of the fuel cell and the hydrogen absorbing tank by a heating medium circulating passage in which a heating medium circulates, and the at least one of the fuel cell and the hydrogen absorbing tank is heated by the heating medium heated by the at least one of the gas compressor and the motor that operates the gas compressor.

2. A hydrogen absorbing tank apparatus according to claim 1, wherein:

the hydrogen absorbing tank has a temperature sensor; and the controller determines whether the hydrogen gas generating pressure is lower than the predetermined reference pressure based on a temperature detected by the temperature sensor.

3. A hydrogen absorbing tank apparatus according to claim 1, wherein:

the hydrogen absorbing tank has a pressure sensor; and the controller determines whether the hydrogen gas generating pressure is lower than the predetermined reference pressure based on a pressure detected by the pressure sensor.

4. A hydrogen absorbing tank apparatus according to claim 1, wherein the controller operates the gas compressor when an amount of hydrogen stored in the hydrogen absorbing tank has decreased and the hydrogen gas generating pressure of the hydrogen absorbing tank has decreased.

5. A hydrogen absorbing tank apparatus according to claim 1, further comprising:

a hydrogen gas generator that supplies hydrogen gas to the hydrogen absorbing tank; wherein when a hydrogen gas generating pressure of the hydrogen gas generator is lower than a predetermined pressure, the controller increases, by using the gas compressor, a pressure of hydrogen gas supplied from the hydrogen gas generator to the hydrogen absorbing tank.

6. A hydrogen absorbing tank apparatus according to claim 1, further comprising:

a hydrogen gas generator that supplies hydrogen gas to the hydrogen gas consumer device; wherein when a hydrogen gas generating pressure of the hydrogen gas generator is lower than the reference pressure of the hydrogen gas consumer device, the controller increases, by using the gas compressor, a pressure of hydrogen gas supplied from the hydrogen gas generator to the hydrogen consumer device.

7. A hydrogen absorbing tank apparatus according to claim 1, wherein the bypass includes a bypass passage that bypasses the gas compressor, and a valve provided in the bypass passage, the valve being openable at a predetermined pressure.

8. A method of operating a hydrogen absorbing tank apparatus comprising:

storing hydrogen gas in a hydrogen absorbing tank containing a hydrogen absorbing material that allows the hydrogen gas to move into the hydrogen absorbing tank from an outside thereof and to move out of the hydrogen absorbing tank;

using a gas compressor disposed between the hydrogen absorbing tank and a hydrogen gas consumer device to compress the hydrogen gas output from the hydrogen absorbing tank at least to a predetermined reference pressure of the hydrogen gas consumer device;

using a bypass connected between the hydrogen absorbing tank and the hydrogen gas consumer device in parallel to the gas compressor to convey the hydrogen gas from the hydrogen absorbing tank to the hydrogen gas consumer device, the bypass opening only when a hydrogen gas generating pressure of the hydrogen absorbing tank is higher than the predetermined reference pressure; and controlling the gas compressor to compress hydrogen gas output from the hydrogen absorbing tank at least to the predetermined reference pressure when the hydrogen absorbing tank has a low temperature and the hydrogen gas generating pressure of the hydrogen absorbing tank is believed to be lower than the predetermined reference pressure.

9. A method according to claim 8, further comprising:

detecting a temperature of the hydrogen absorbing tank; and controlling the gas compressor by determining whether the hydrogen gas generating pressure is lower than the predetermined reference pressure based on the detected temperature.

10. A method according to claim 8, further comprising:

detecting a pressure of the hydrogen absorbing tank; and controlling the gas compressor by determining whether the hydrogen gas generating pressure is lower than the predetermined reference pressure based on the detected pressure.

11. A method according to claim 8, wherein:

the hydrogen gas consumer device includes a fuel cell from which heat is supplied to the hydrogen absorbing tank; and the controlling step includes operating the gas compressor during an initial period of operation of the fuel cell.

12. A method according to claim 11, wherein at least one of the gas compressor and a motor that operates the gas compressor is connected to at least one of the fuel cell and the hydrogen absorbing tank by a heating medium circulating passage in which a heating medium circulates, and the at least one of the fuel cell and the hydrogen absorbing tank is heated by the heating medium heated by the at least one of the gas compressor and the motor that operates the gas compressor.

13. A method according to claim 11, wherein the controlling step includes operating the gas compressor when an amount of hydrogen stored in the hydrogen absorbing tank has decreased and the hydrogen gas generating pressure of the hydrogen absorbing tank has decreased.

14. A method according to claim 11, further comprising:

supplying hydrogen gas to the hydrogen absorbing tank with a hydrogen gas generator; and when a hydrogen gas generating pressure of the hydrogen gas generator is lower than a predetermined pressure, the controlling step includes increasing, by using the gas compressor, a pressure of hydrogen gas supplied from the hydrogen gas generator to the hydrogen absorbing tank.

15. A method according to claim 11, further comprising:

supplying hydrogen gas to the hydrogen gas consumer device with a hydrogen gas generator; and when a hydrogen gas generating pressure of the hydrogen gas generator is lower than the predetermined reference pressure of the hydrogen gas consumer device, the controlling step includes increasing, by using the gas compressor, a pressure of hydrogen gas supplied from the hydrogen gas generator to the hydrogen gas consumer device.

16. A method according to claim 8, wherein the bypass includes a bypass passage that bypasses the gas compressor, and a valve provided in the bypass passage, the valve is opened at a predetermined pressure.

* * * * *